United States Patent
Peterson, Jr. et al.

(10) Patent No.: US 7,131,648 B2
(45) Date of Patent: Nov. 7, 2006

(54) SEAL CONSTRUCTION INCLUDING A COMPRESSIBLE SPRING MECHANISM FOR BEARING PRELOAD

(75) Inventors: Richard E. Peterson, Jr., East Troy, WI (US); Merrill Karcher, Lake Geneva, WI (US)

(73) Assignee: Trostel, Ltd., Lake Geneva, WI (US)

( * ) Notice: Subject to any disclaimer, the term of this patent is extended or adjusted under 35 U.S.C. 154(b) by 269 days.

(21) Appl. No.: 10/638,575

(22) Filed: Aug. 11, 2003

(65) Prior Publication Data

US 2005/0035555 A1 Feb. 17, 2005

(51) Int. Cl.
*F16J 15/32* (2006.01)

(52) U.S. Cl. .................. 277/553; 277/549; 277/551; 277/554; 277/555

(58) Field of Classification Search ............... 277/549, 277/551, 553, 554, 555, 572
See application file for complete search history.

(56) References Cited

U.S. PATENT DOCUMENTS

| | | | |
|---|---|---|---|
| 3,999,745 A | | 12/1976 | Mahoff |
| 4,410,189 A | * | 10/1983 | Myers et al. ............... 277/530 |
| 5,140,904 A | * | 8/1992 | Schonlau ........................ 92/27 |
| 5,607,168 A | | 3/1997 | Dahll |
| 6,435,516 B1 | * | 8/2002 | Scott ........................... 277/553 |

FOREIGN PATENT DOCUMENTS

| | | |
|---|---|---|
| CH | 395914 | 7/1965 |
| GB | 2216963 | 10/1989 |
| WO | WO 01/88415 A1 | 11/2001 |

* cited by examiner

*Primary Examiner*—Enoch Peavey
(74) *Attorney, Agent, or Firm*—Quarles & Brady LLP

(57) ABSTRACT

A seal assembly adapted for use in creating a seal between an axially extending shaft and a support member. The seal assembly defines an axial passage through which the shaft extends, wherein a bearing assembly is mounted to the support member and includes a stationary outer race and an inner race which rotates along with the shaft. The seal assembly includes a rigid ring defining an axial passage through which the shaft extends and a resilient material carried by the ring. The resilient material defines an inner sealing section adapted to engage the shaft and an outer sealing section located radially outwardly of the inner sealing section and adapted to engage an outer sealing surface associated with the support member.

15 Claims, 4 Drawing Sheets

SEAL CONSTRUCTION INCLUDING A COMPRESSIBLE SPRING MECHANISM FOR BEARING PRELOAD

CROSS REFERENCES TO RELATED APPLICATIONS

Not Applicable

STATEMENT REGARDING FEDERALLY SPONSORED RESEARCH

Not Applicable

BACKGROUND OF THE INVENTION

This invention relates to seal assemblies, and more particularly to a seal assembly for sealing a rotatable shaft and for providing a preloading force on a bearing assembly which rotatably supports the shaft.

Various seal constructions are known for sealing about a rotatable shaft. In most applications, however, the seal is located in the vicinity of a bearing assembly which rotatably supports the shaft, such that there is typically no interaction between the bearing assembly and the seal assembly.

In certain applications, such as in a horizontal axis washing machine, a rotatable shaft is supported by a bearing assembly which is located in close proximity to a member mounted to the shaft and rotatable with the shaft, such as the end of a drum carried by the shaft. This application requires a seal construction which is capable of placement in a relatively small sealing space between the end of the drum and the bearing assembly. In such an application, it may be necessary to provide an axial preloading force on the inner race of the bearing assembly relative to the outer race, so as to provide proper functioning of the bearing assembly. It is necessary to control the preloading force to ensure that a sufficient amount of force is exerted on the inner race of the bearing assembly to provide proper functioning, and to also ensure that the preloading force does not exceed that which could cause failure of the bearing assembly.

SUMMARY OF THE INVENTION

The invention contemplates a seal assembly adapted for use in creating a seal between an axially extending shaft and a support member defining an axial passage through which the shaft extends. A bearing assembly is mounted to the support member and includes a stationary outer race and an inner race which rotates along with the shaft. The seal assembly includes a seal member having an inner sealing section adapted to engage the shaft, and an outer sealing section located radially outwardly of the inner sealing section and adapted to engage an outer sealing surface. An axial biasing member, such as an axially compressible spring finger spring, is embedded in the seal member and exerts an axial preloading force on the inner race of the bearing assembly relative to the outer race.

It is a general objective of the present invention to provide a seal assembly for providing a seal between a rotatable shaft and a support member to which a bearing assembly is mounted and which rotatably supports the shaft relative to the support member. This objective is accomplished by providing a seal assembly including a seal member for assembling between a rotatable shaft and a support member.

Another objective of the invention is to provide such a sealing assembly which provides an axial preloading force on an inner race of the bearing assembly, to ensure the proper functioning of the bearing assembly. This objective is accomplished by providing an axial biasing member which can exert an axial preloading force on a bearing assembly inner race.

A still further objective of the invention is to provide a seal assembly which is relatively simple in construction and in the manner in which the seal assembly is installed. This objective is accomplished by providing an axial biasing member that is embedded in the seal member.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE INVENTION

Figure 1:
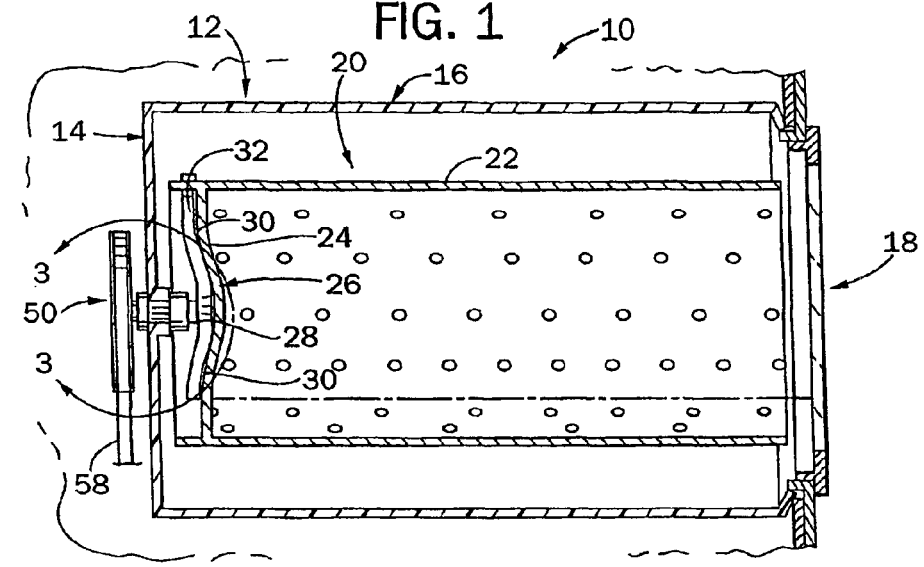
FIG. 1 is a sectional view of a horizontal axis washing machine, illustrating a representative application of the seal assembly of the present invention.

FIG. 1 generally illustrates an application for the seal assembly of the present invention in the form of a horizontal axis washing machine 10 which would generally include a stationary cylindrical tub 12 which includes a rear end wall 14 and a side wall 16. Tub 12 defines an open front end, and washing machine 10 includes a door 18 which can be selectively opened or closed to provide access to the interior of a drum 20, in a known manner.

Drum 20 is disposed within tub 12, which may be formed of a material such as ABS plastic, and drum 20 includes a perforated side wall 22 and a rear end wall 24. Tub 12 includes an open front end, which allows items to be placed within the interior of drum 20 when door 18 is open. The rear end of drum 20 adjacent rear end wall 24 is mounted to a drum support member 26, which includes a central hub area 28 and a series of legs 30 extending outwardly therefrom. Drum support member 26 is constructed of a lightweight, strong and rigid material, such as cast aluminum, and drum 20 is preferably formed of a relatively lightweight and durable material, such as stainless steel, although it is understood that other satisfactory materials could be employed. Openings are formed in side wall 22 adjacent end wall 24, and threaded fasteners such as screws 32 extend through the openings in side wall 22 and into threaded openings extending inwardly from the ends of legs 30 for mounting drum 20 to drum support member 26.

Figure 2:
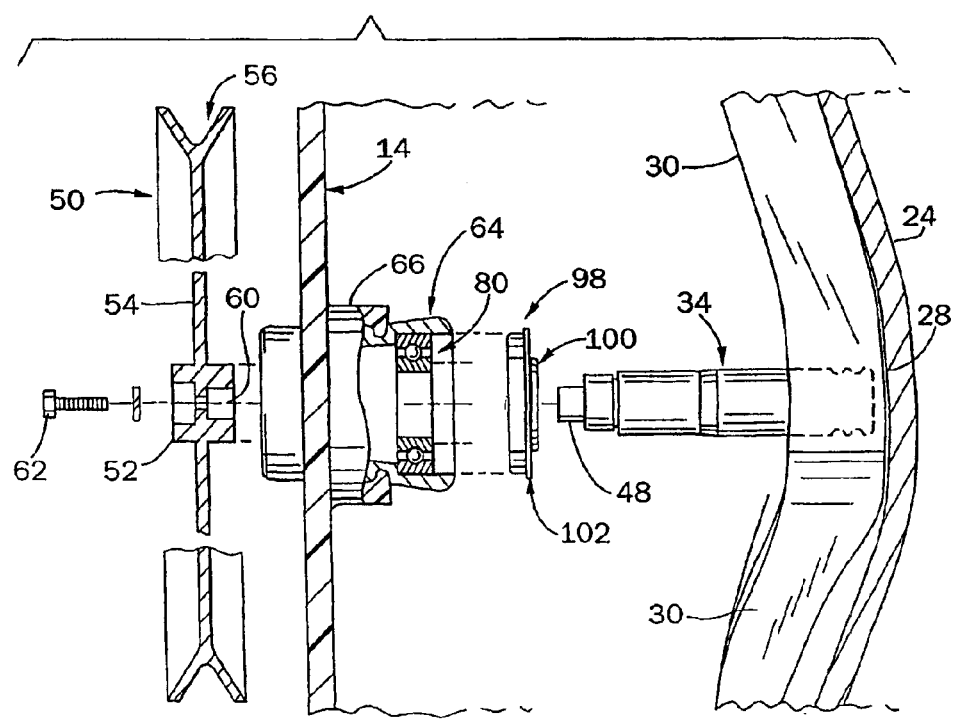
FIG. 2 is an exploded partial section view of the components incorporated into the assembly of FIG. 1, including the seal assembly of the present invention.
Figure 3:
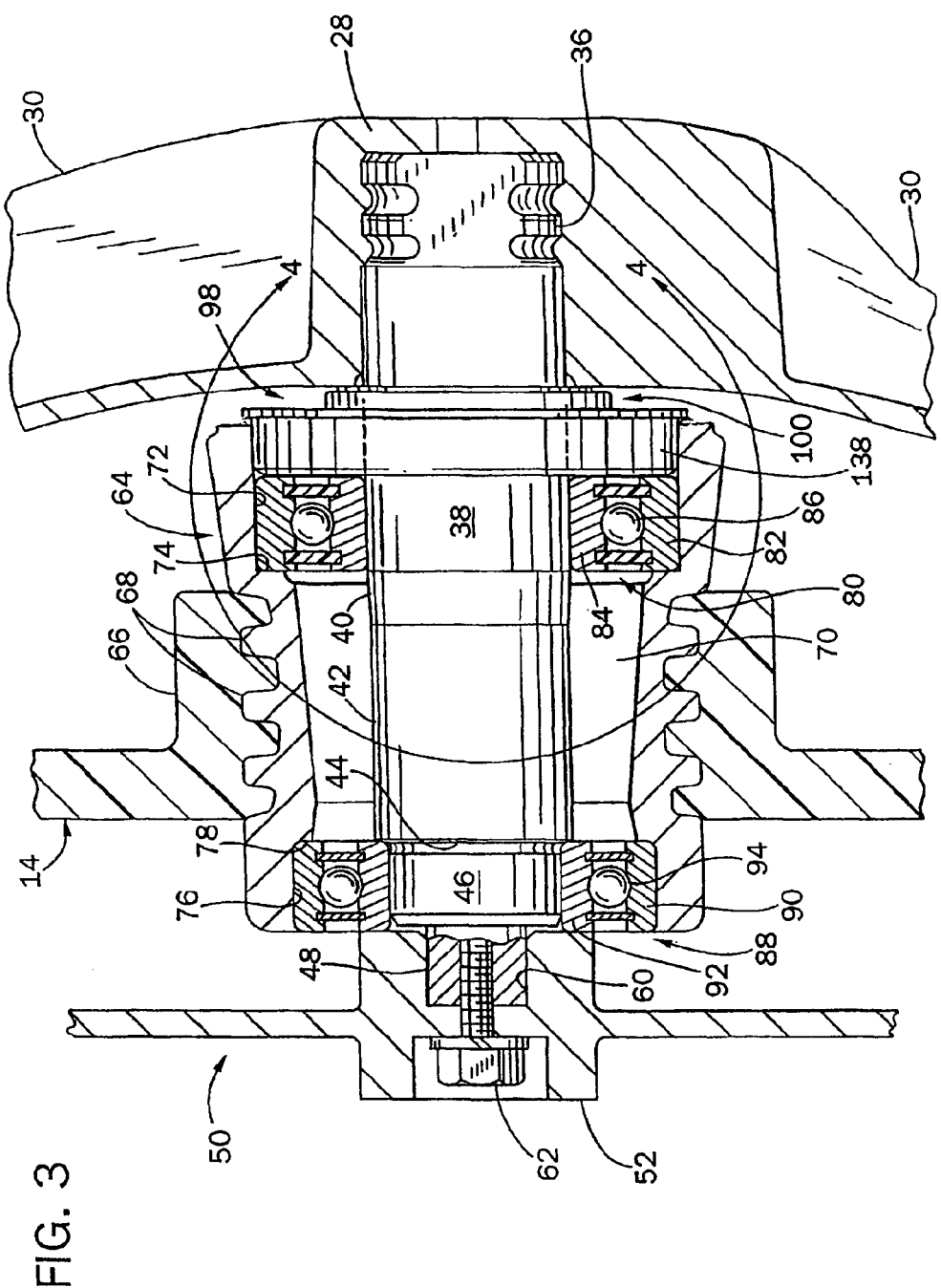
FIG. 3 is an enlarged partial section view of components of FIG. 2 in assembled form with reference to line 3—3 of FIG. 1.

As shown in FIGS. 2 and 3, a shaft 34 extends rearwardly from hub area 28 of drum support member 26. Shaft 34 includes a forward mounting section 36 which is cast into the material of drum support member 26. Shaft 34 further includes a front bearing surface 38 located rearwardly of drum support member 26, a tapered surface 40 located rearwardly of front bearing surface 38, and a rear section 42 terminating at a shoulder 44. A rear bearing surface 46 extends rearwardly from shoulder 44, and a rear mounting hub 48 having an irregular cross section (such as including one or more flat areas) extends rearwardly from rear bearing surface 46.

A pulley 50 is adapted for mounting to rear mounting hub 48 of shaft 34. Pulley 50 includes a central hub 52 and a web 54 terminating in an outer flange area 56, which is adapted to receive a drive belt 58 (FIG. 1) driven by a motor in a conventional manner. Hub 52 of pulley 50 includes a recess 60 which mates with rear mounting hub 48 of shaft 34 for providing driving engagement of pulley 50 with drive shaft 34. A threaded fastener, such as a screw 62, extends through an opening in hub 52 and into a threaded passage extending inwardly into rear mounting hub 48 of shaft 34 for securing pulley 50 to shaft 34.

A bearing housing 64 is mounted to a central mounting section 66 of tub end wall 14. Bearing housing 64 has a series of projections 68 which form an irregular surface, and the material of central mounting section 66 is molded about projections 68 for providing a secure mounting of bearing housing 64 to tub 12. Bearing housing 64 includes an axially extending passage 70 through which shaft 34 extends. The internal wall of bearing housing 64, which defines passage 70, includes a forward side wall 72 terminating in a shoulder 74, which cooperate to define a forwardly facing recess, and a rear side wall 76 terminating in a shoulder 78, which cooperate to define a rearwardly facing recess.

A forward bearing assembly 80 is fitted into the forwardly facing recess defined by forward side wall 72 and shoulder 74 such that the rear surface of outer race 82 engages shoulder 74. Forward bearing assembly 80 is of conventional ball bearing construction, including an outer race 82, an inner race 84, and a series of ball-type rollers 86 disposed between outer race 82 and inner race 84. Representatively, bearing assembly 80 may be a bearing assembly such as is available from SKF Group of Sweden, under its designation 6207-2RSI/C3, although it is understood that other satisfactory ball-type bearing assemblies may be employed.

Similarly, a rear ball-type bearing assembly 88 is located within the rearwardly facing recess defined by rear side wall 76 and shoulder 78. Rear bearing assembly 88 includes outer and inner races 90, 92, respectively, and ball-type roller members 94 therebetween. Representatively, bearing assembly 88 may be a bearing assembly such as is available from SKF Group, under its designation 6206-2Z/C3 although it is understood that other satisfactory bearing assemblies may be employed.

Figure 4:
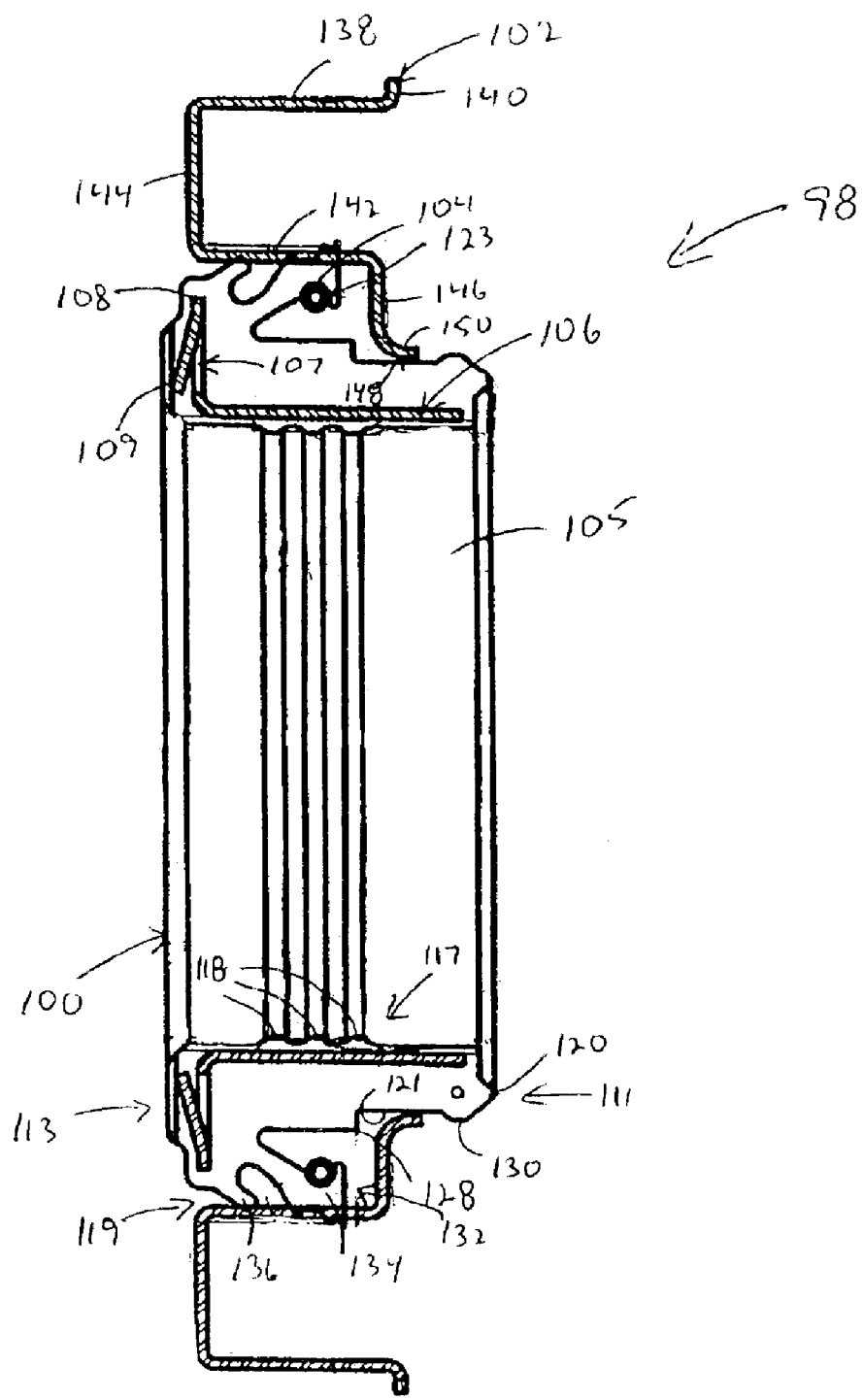
FIG. 4 is a cross sectional view of the seal assembly of FIG. 1.

A seal assembly 98 shown in FIGS. 2–4 is engaged within the forward portion of the forwardly-facing recess defined by forward side wall 72 and shoulder 74. The seal assembly 98 generally includes an annular seal member 100, an annular wear member 102, and a radial biasing member 104 to provide a liquid-tight seal between bearing housing 64 and shaft 34, in a manner to be explained so as to prevent liquids contained within tub 12 from entering into passage 70 in bearing housing 64, to maintain such liquids within tub 12 and to prevent contact of liquid with bearing assemblies 80, 88.

Figure 5:
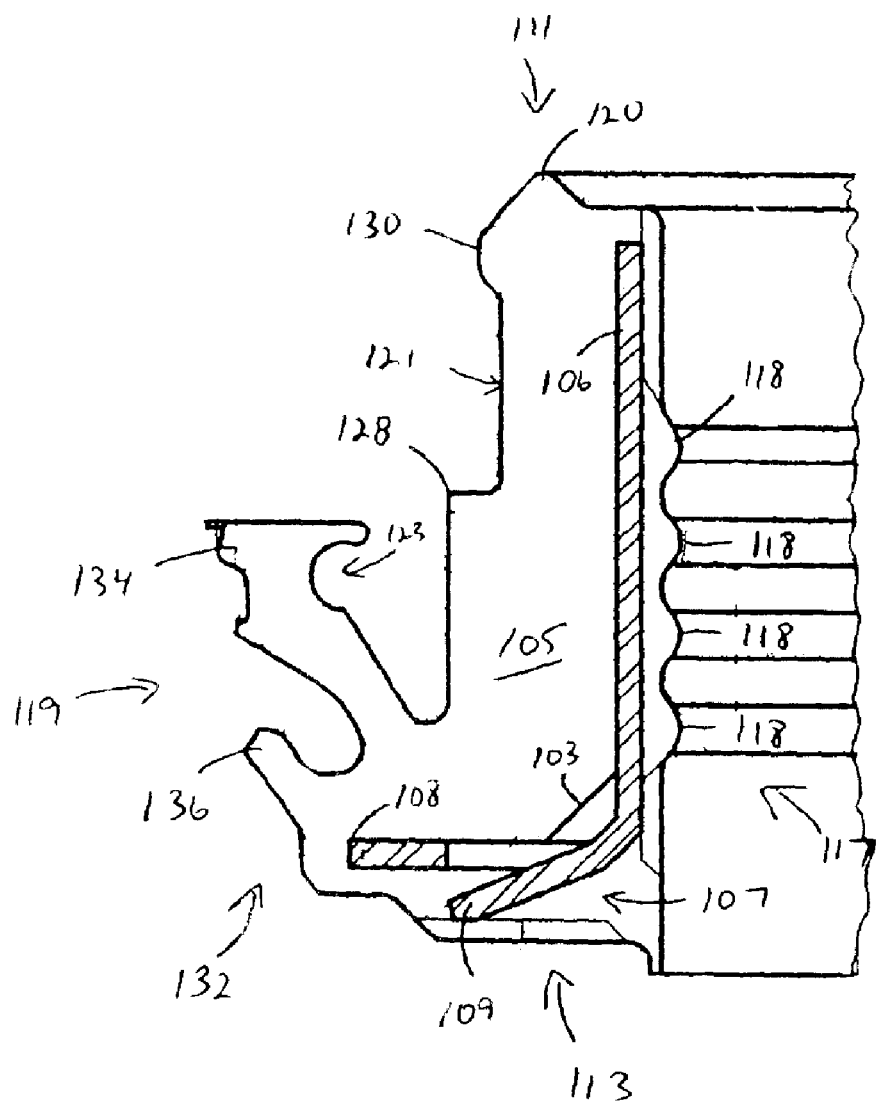
FIG. 5 is a detailed cross sectional view of the seal member of FIG. 4.

Seal member 100, shown in FIGS. 4 and 5, is formed of a rigid ring 106 with resilient material 105 bonded thereto. Ring 106 is preferably formed of a metallic material, such as AISI 1008, although it is understood that other satisfactory materials could be employed. Ring 106 includes a radially extending flange 108 that extends radially outwardly from a rearward edge of ring 106.

An axial biasing member 107 formed in the radially extending flange 108 exerts a force on the inner race 84 of the bearing assembly 80 to provide an axial preloading force on the inner race 84 of the bearing assembly 80 relative to the outer race 82, so as to provide proper functioning of the bearing assembly 80. In the embodiment disclosed herein, the axial biasing member 107 is a finger spring 109 extending from the radially extending flange 108. Gussets 103 between adjacent finger springs 109 stiffen ring 106. Preferably, the axial biasing member 107 includes a plurality of equidistantly, radially spaced finger springs 109 formed in the flange 108, such as by a punch, to provide a circumferentially constant axial force on the inner race 84 of the bearing assembly 80.

Axial biasing member 107 is shown as a compression-type finger spring 109. It is understood, however, that the axial biasing member 107 may take any other satisfactory form providing an axial biasing force. Examples include, but are not limited to, a wave spring, a canted coil spring, coil spring, or other spring elements formed integrally with rigid ring 106 of seal member 100, or a circlip-type spring. Moreover, although a finger spring 109 formed as an integral part of the ring 106 is disclosed, biasing members independent of the ring can be used without departing from the scope of the invention.

The resilient material 105 of seal member 100 is bonded to ring 106 in a conventional manner, and may be a material such as an acrylonitrile/butadiene rubber, although it is understood that other satisfactory materials could be employed The resilient material is bonded to ring 106, such that the ring 106 including the flange 108 and axial biasing member 107 is embedded in the material 105. Advantageously, embedding at least a portion of the biasing member 107 in the material 105 simplifies assembly of the seal assembly 98 in the washing machine 10 by reducing the number of independent parts forming the seal assembly 98.

The resilient material 105 is carried by the ring 106, and defines forward and rearward axial ends 111, 113 joined by radially inner and outer surfaces 117, 119 of the seal member 100. Preferably, the radially inner surface 117 defines an inner sealing section including a series of inwardly extending parallel ribs 118 for engagement with the shaft 34. The material 105 forming the forward axial end 111 defines a bead or rib 120 for engaging the surface of hub area 28. The rearward axial end 113 covers the axial biasing member 107, and is urged against the bearing assembly inner race 84 to preload the inner race 84 relative to the outer race 82. Of course, the axial biasing member 107 can extend through the material 105 and engage the inner race 84 without departing from the scope of the invention.

The radially outer surface 119 of the material 105 includes an outwardly extending protrusion 130 located forwardly of shoulder 128 to define an engagement surface 121 therebetween for engaging an edge 148 of the wear member 102. The radially outer surface 119 also defines an outer sealing section 132 capable of deflecting inwardly. The outer sealing section 132 includes a forward lip 134 and a rearward lip 136, both of which sealingly engage the wear member 102.

A radially inwardly opening groove 123 formed on a radially inner surface 125 of the forward lip 134 receives the radial biasing member 104 which urges the forward lip 134 against the wear member 102, such that the forward lip 134 sealingly engages the wear member 102. Preferably, the radial biasing member 104 is a coil or garter spring, however, other structure for biasing the forward lip 134 and/or the rearward lip 136 radially outwardly, such as leaf springs embedded in the material 105 and the like, can be used without departing from the scope of the invention.

Wear member 102 defines channel-like cross section including an outer wall 138 terminating in an outwardly extending forward flange 140. A concentric inner wall 142 is located inwardly of outer wall 138, and a transverse rear wall 144 extends between and interconnects the rearward ends of outer wall 138 and inner wall 142. At its forward end, inner wall 142 merges with an inwardly extending forward wall 146. At its inward end, inwardly extending forward wall 146 merges with a forwardly extending inner wall 150 which terminates in an forwardly facing edge 148 which defines a central opening in wear member 102. The diameter of the opening defined by edge 148 is sized so as to enable the forward end of seal member 100, located forwardly of shoulder 128, to pass through the opening defined by edge 148. Protrusion(s) 130 are deformable when seal member 100 is inserted through the opening in wear member 102 in this manner, and in their undeformed condition, protrusion(s) 130 function to maintain wear member 102 in engagement with seal member 100.

In assembly, seal assembly 98 is installed as follows. Initially, seal assembly 98 is assembled and shipped in the condition shown in FIG. 2, in which the wear member 102 is engaged with the seal member 100. Once forward bearing assembly 80 is installed within the forwardly-facing recess defined by side wall 72 and shoulder 74, wear member 102 is press-fit into the recess forwardly of bearing assembly 80 to attain an installed condition, as illustrated in FIGS. 3 and 4. When installed in this manner, outer wall 138 of wear member 102 is securely seated within the recess defined by side wall 72, and flange 140 does not engage the forwardly facing surface of bearing housing 64. The channel-like construction of wear member 102 enables outer wall 138 to deflect inwardly a slight amount if required, to provide a secure press-type friction fit of wear member 102 to bearing housing 64. Rear wall 144 of wear member 102 does not engage outer race 82 of bearing assembly 80 when wear member 102 is press-fit into the recess in bearing housing 64 in this manner. Upon installation of seal assembly 98, axial biasing member exerts an axial force on the inner race 84 of forward bearing assembly 80.

Seal assembly 98 is assembled by slipping seal member 100 into the central opening of the wear member 102, such that sealing member lips 134, 136 engage the wear member inner wall 142 and the wear member edge 148 engages the seal member engagement surface 121. As described above, the radial biasing member 104 urges the forward lip 134 against the wear member inner wall 142. Once the seal assembly 98 is assembled, the seal assembly 98 is press-fit into the recess in bearing housing 64, and axial biasing member 107 is compressed. The compressed axial biasing member 107 exerts an axial force against the bearing assembly inner race 84, as described above. Engagement of shoulder 128 with inner wall 146 of wear member 102 maintains engagement of seal member 100 with wear member 102.

With seal assembly 98 installed in bearing housing 64 in this manner, shaft 34, with drum 20 mounted thereto, is then inserted into passage 20 in bearing housing 64. Shaft 34 passes through seal assembly 98, forward bearing assembly 80 and rear bearing assembly 88, to attain the assembled condition as shown in FIG. 1–3, wherein front bearing surface 38 engages inner race 84 of forward bearing assembly 80 and rear bearing surface 46 engages inner race 92 of rear bearing assembly 88. In this manner, shaft 34 is rotatably supported relative to bearing housing 64 by front and rear bearing assemblies 80, 88 respectively. Pulley 50 is then mounted to the rear end of shaft 34, as described previously.

In operation, seal assembly 98 provides a liquid-tight seal about shaft 34. Ribs 118 engage the outer surface of shaft 34 forwardly of bearing surface 38. Forwardly-extending rib 120 engages the rearwardly facing surface of hub area 28 of drum support area 26, and the combination of ribs 118,120 functions to prevent ingress of liquid inwardly of ribs 118. Engagement of lips 134,136 with the wear member inner wall 142 likewise prevents ingress of liquid through the space between wear member 102 and the seal member 100.

In operation, seal member 100 rotates along with shaft 34, while wear member 102 remains stationary. Lips 134,136 thus move on the inwardly facing surface of wear member inner wall 142 in operation, and the construction of lips 134,136 provides sealing engagement therebetween during such rotation of seal member 100.

Axial biasing member 107 provides the dual function of exerting a forward axial force to seat rib 120 against the rearwardly facing surface of hub area 28, and a rearward axial force on inner race 84 of forward bearing assembly 80. The size and strength of axial biasing member 107 is selected such that the preloading force exerted by axial biasing member 107 is sufficient to provide proper preloading of inner race 84 relative to outer race 82 to ensure that inner race 84 rotates with shaft 34, with a force which is sufficiently controlled so as to ensure that excessive force is not exerted on inner race 84. The degree of force exerted by axial biasing member 107 will vary somewhat according to manufacturing and installation tolerances.

In addition, the relationship between seal member 100 and shaft 34 is coordinated such that the amount of force required to axially move seal member 100 on shaft 34 does not exceed the force of axial biasing member 107. The fit of ribs 118 on shaft 34 is such as to ensure proper sealing while still enabling seal member 100 to move on shaft 34 by the force of axial biasing member 107, which preloads bearing assembly inner race 84. Representatively, the axial sliding force between seal member 100 and shaft 34 is selected so as to be less than approximately 100 Newtons, and the force of axial biasing member 107 is selected so as to be approximately 550 Newtons. It is understood that other force ratios could be selected, but this example illustrates a ratio which has been found to be satisfactory.

In addition, lips 134,136 are designed in conjunction with radial biasing member 104 such that drag forces exerted by lips 134,136 and radial biasing member 104 against the inner surface of outer wall 142 are less than the force required to turn seal member 100 relative to shaft 34, under the full range of operating conditions. For example, centrifugal forces exerted on lips 134,136 and radial biasing member 104 by rotation of shaft 34 increase the drag forces between lips 134,136 and wall 142, and lips 134,136 and radial biasing member 104 are designed such that under maximum speeds of rotation the drag forces exerted by lips 134,136 and radial biasing member 104 do not exceed forces required to turn seal member 100 on shaft 34. In this manner, there is no relative rotation between seal member 100 and shaft 34 in operation.

The present invention thus provides a compact, efficient seal assembly which functions to provide a liquid-tight seal for a rotating shaft and which provides a preloading force for a bearing arrangement located adjacent to the seal. The components of the seal assembly are assembled together prior to installation, which reduces installation, assembly and shipment costs. The seal assembly occupies a minimum amount of space, and the axial force exerted by the spring both preloads the bearing assembly and assists in sealing about the shaft. The preloading force exerted by the spring is controlled throughout the full range of manufacturing and installation tolerances.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention. For example, lips 134,136 are shown as facing radially outward. It is understood, however, that the lips may take any other satisfactory form. Examples include, but are not limited to, lips facing radially inward, axial lips, radial lips without a separate radial biasing member, radial lips with an alternative lip engaging element, or other lip configurations forming part of the seal member 100.

We claim:

1. A seal assembly adapted for use in creating a seal between an axially extending shaft and a support member defining an axial passage through which the shaft extends, wherein a bearing assembly is mounted to the support member and includes a stationary outer race and an inner race which rotates along with the shaft, said seal assembly comprising:
   a rigid ring defining an axial passage through which the shaft extends;
   a resilient material carried by said ring, said resilient material defining an inner sealing section adapted to engage the shaft and an outer sealing section located radially outwardly of the inner sealing section and adapted to engage an outer sealing surface associated with the support member; and
   an axial biasing member embedded in said resilient material between the inner and outer sealing sections, wherein the axial biasing member is adapted to provide an axial preloading force on the inner race relative to the outer race.

2. The seal assembly of claim 1, wherein the ring includes a radially extending flange, and at least one spring finger extends from said flange to form said axial biasing member.

3. The seal assembly of claim 1, wherein the resilient material forming the inner sealing section includes a plurality of inwardly facing, axially spaced ribs adapted to engage the shaft.

4. The seal assembly of claim 1, wherein the outer sealing section includes at least one outwardly facing lip adapted to engage the outer sealing surface associated with the support member.

5. The seal assembly of claim 4, including a radial biasing member engaging said at least one outwardly facing lip and urging said at least one outwardly facing lip radially outwardly to sealingly engage the outer sealing surface associated with the support member.

6. The seal assembly of claim 1, wherein said resilient sealing material is bonded to the ring.

7. The seal assembly of claim 1, wherein the outer sealing surface associated with the support member comprises an annular wear member engaged within a recess formed in the support member.

8. The seal assembly of claim 7, wherein the annular wear member is press-fit within the recess and engaged with an inwardly facing wall defined by the support member and forming at least a portion of the recess.

9. A seal assembly adapted to provide a seal between an axially extending shaft and a hub member defining an axial passage through which the shaft extends, wherein an end of the hub member includes an outwardly opening recess having a shoulder which is adapted to support an outer race of a bearing assembly which includes an inner race engageable with the shaft, said seal assembly comprising:
   a wear member defining an inwardly facing wear surface spaced radially from the shaft, wherein the wear member is adapted to be received within the recess in the end of the hub member;
   a seal member including an inner sealing section adapted to engage the shaft, and an outer sealing section located radially outwardly of the inner sealing section and adapted to engage the wear surface defined by the wear member; and
   an axial biasing member embedded in said seal member and located between the inner and outer sealing sections, wherein the biasing member is adapted to exert an axial force against the inner race of the bearing assembly so as to provide an axial preloading force on the inner race of the bearing assembly relative to the outer race.

10. The seal assembly of claim 9, wherein the seal member comprises a rigid ring, and resilient sealing material is bonded to the rigid ring member to form the inner and outer sealing sections, and said axial biasing member is embedded in said resilient sealing material.

11. The seal assembly of claim 9, wherein the rigid ring member further includes a radial flange and the axial biasing member extends from the radial flange of the rigid ring member.

12. The seal assembly of claim 9, wherein the outer sealing section includes at least one outwardly facing lip adapted to engage the wear member.

13. The seal assembly of claim 12, including a radial biasing member engaging said at least one outwardly facing lip and urging said at least one outwardly facing lip radially outwardly to sealingly engage the wear member.

14. A seal assembly adapted to provide a seal between an axially extending shaft and a first surface spaced radially from the shaft, the seal assembly comprising:
   a rigid ring defining an axial passage through which the shaft extends;
   a resilient material carried by said ring, said resilient material defining an inner sealing section adapted to engage the shaft and an outer sealing section located radially outwardly of the inner sealing section and adapted to engage the first surface spaced radially from the shaft; and
   an axial biasing member embedded in said resilient material between the inner and outer sealing sections, wherein the axial biasing member is adapted to exert an axial force on a second surface axially abutting the seal assembly.

15. The seal assembly of claim 14, wherein the outer sealing section includes at least one outwardly facing lip adapted to engage the first surface, and said seal assembly includes a radial biasing member engaging said at least one outwardly facing lip and urging said at least one outwardly facing lip radially outwardly to sealingly engage the first surface.

* * * * *